Patented Feb. 22, 1944

2,342,294

UNITED STATES PATENT OFFICE 2,342,294

DOUBLE SALICYLIC ACID TYPE COMPOUND AND METHOD OF PREPARING SAME

Joseph B. Niederl, Brooklyn, N. Y.

No Drawing. Application March 13, 1940,
Serial No. 323,789

21 Claims. (Cl. 260—479)

This invention relates to double salicylic acid type compounds and to a process for preparing them from bis-phenols.

In accordance with one embodiment of the invention, an alcoholic solution of a bis-phenol is reacted with a sodium alcoholate to form the di-sodium salt. Upon completion of the reaction, an inert absorbent is added, the solvent is driven off and the substantially anhydrous salts left as a finely dispersed deposit on the inert absorbent, asbestos or glass wool. These finely dispersed salts are next reacted with carbon dioxide at a temperature of 180° C. and at atmospheric pressure until carboxylation of the bis-phenol has taken place. The reaction product is then cooled, isolated and purified in accordance with conventional procedure.

Basically considered, this invention involves the introduction of carboxyl groups into phenolic benzene rings of bis-phenols. In some respects the process resembles a process of the prior art known as the Kolbe synthesis, wherein salicylic acid is prepared by treating the sodium salt of phenol with carbon dioxide at superatmospheric pressures at a temperature of about 130° C. Although the present process also involves reaction of carbon dioxide with the salts of phenolic compounds, the prior art reaction conditions appear to be unsatisfactory for the production of the bis-salicylic acid type compounds of this invention.

In contrast with the prior art, reaction conditions for introducing the carboxyl group into a phenolic benzene ring, as exemplified by the Kolbe synthesis, it was found that compounds of the double salicylic acid type can be prepared in good yields from bis-phenols at atmospheric or subatmospheric pressures by carboxylating substantially dry alkali metal salts of compounds of the bis-phenol type by reacting them with carbon dioxide at a temperature of about 180° C. Temperatures as low as 140° C. were found to give operable results. Higher temperatures can also be used provided they are not sufficiently high to decompose the salts or the reaction products.

Particularly high yields of the compounds of this invention can be obtained under these reaction conditions when provision is made for the extension of the surface area of the salt exposed to the carbon dioxide gas during the reaction period. This extension may be accomplished by any of the well known methods, including agitation, but is most effectively extended by incorporating a quantity of an absorbent or adsorbent material in the reaction vessel and finely dispersing the salt therein or thereon, and I therefore preferably make use of material such as glass wool and asbestos in the reaction vessel.

The bis-phenols employed as starting materials in the process of my invention include alkylidene di-phenols and/or aryl-alkylidene-di-phenols of the following general structural formula:

or

and to cyclo-alkylidene-di-phenols of the following structural formula:

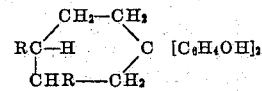

or

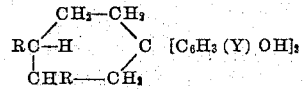

in which R represents hydrogen or an aliphatic or aromatic radical, and wherein Y represents an alkyl or alkoxy group in ortho position to the phenolic-hydroxyl group. These bis-phenols may be prepared by condensing the respective monoketones with two mols of the phenol or its ortho alkylated homologues. A condensation process of this general type is described in an article written by the inventor and his coworkers, appearing in the Journal of the American Chemical Society, volume 61, pages 345, et seq., 1939, volume 62, pages 322, et seq., 1940, and volume 62, pages 322, et seq., 1940.

The bis-phenol type compound which is to be carboxylated is first converted into its alkali metal salt, and this is accomplished by any of the procedures already known to the art. The bis-phenols, for example, may be dissolved in an alcohol solvent and then reacted with an alkali metal to form an alcoholate. This method is particularly suitable for the preferred embodiment of this process in which an adsorbent or absorbent material is made use of during the carboxylation in order that the salts formed and left as a residue within the reaction chamber are finely distributed over the large surface area presented by the absorbent material, and therefore admirably positioned for making intimate contact with the molecules of carbon dioxide subsequently introduced into the chamber.

The carboxylation of the bis-phenol salts may be carried out in the same reaction chamber, but before this step is commenced the salts are made substantially anhydrous by driving off the alcohols present with the aid of heat. Carbon dioxide gas is brought into intimate contact with the finely distributed salt at atmospheric or subatmospheric pressures, at a temperature preferably maintained at 180° C. The reaction may be carried out at higher temperatures provided the salt or the reaction products formed do not decompose.

In accordance with another feature of the process of the invention, the carbon dioxide used is preliminarily and carefully dried and purified to remove deleterious substances ordinarily present in such gas when the same is produced by conventional methods. If, however, a source of relatively pure gas is available no additional treatment is required.

The reaction product resulting from the carboxylation can be isolated and purified in any of the well known ways. For example, it may be taken up with water, acidified with a mineral acid, filtered and dried. Any mono-salicylic acid or unreacted starting material may be leached therefrom with a suitable solvent.

Double salicylic acid type compounds prepared in accordance with the process herein outlined can readily be reacted to obtain metal salts which are admirable intermediates for the production of pharmaceuticals. These salts can readily be obtained by dissolving the bis-salicylic acid in a suitable solvent such as alcohol and treating the solution with a metal hydroxide. The resulting reaction product, upon being isolated and purified, is either the mono- or di-metallic salt of the bis-salicylic acid type compound, depending upon the proportion of reactants used.

The bis-salicylic acid type compounds are also admirably suitable for reactions which form esters with organic acids of the aliphatic or aromatic series. The di-acetate of bis-salicylic acid may be formed by refluxing the bis-salicylic acid with acetic acid anhydride for a period of six hours. Other fatty acid derivatives, including those of lower and higher molecular weight and those of saturated and unsaturated character, can be made to react with the bis-salicylic acids to form mono- or di-esters.

Innumerable salicylic acid type compounds can be prepared in accordance with the instant invention, as the specific nature of the final product is determined both by reaction conditions and the nature of the intermediate used as a starting material. For example, under the proper reaction conditions it is possible to obtain single as well as double salicylic acid type compounds, while variations in the type of bis-phenol used will produce corresponding variations in the salicylic acid compound produced.

By formula, the double salicylic acid type compounds of the invention may be collectively referred to as bis-salicylic acid type compounds of the general structural formula:

$$R[C_6H_2(COOX)(Y)OZ]_2$$

wherein R represents an alkylidene, cyclo-alkylidene or aryl-alkylidene radical, X represents hydrogen, a metal atom or an alkyl group, Y represents a hydrogen atom or an alkyl or alkoxy radical, and Z represents hydrogen or an acyl radical which may be of an aliphatic or aromatic nature.

The structure of the radical designated by the letter R in the general formula given above is determined by the structure of the particular bis-phenol selected as the starting material. As has been indicated by formulae in the introductory portion of the specification, a very broad class of radicals is included thereunder. This radical may be a straight or branched chain alkylidene, such as butyl or isobutylidene, an aryl alkylidene, such an phenyl-ethyl-, or (methyl-phenyl)-butylidene, or a cyclo-alkylidene, such as cyclo-hexyl- or a substituted cyclohexylidene radical.

The structure of the radical designated by the letter Y in the general formula is also determined by the structure of the particular bis-phenol used as the raw material. As has been indicated above, this letter may designate a hydrogen atom or an alkyl or an alkoxy group. These latter groups may be of a lower or higher molecular nature, either straight chained or branched.

The salts and the esters of the compounds of the double salicylic acid type which are produced in accordance with the process outlined above are also included within the scope of the products of the present invention. From consideration of the formula, it will be noticed that the letters "X" and "Z" may be varied to an extent which covers acids and salts as well as esters. In those embodiments of the formula in which both the X and the Z designate hydrogen, the product is the acid. If either letter does not designate hydrogen, the formula is either the salt or the ester.

Alkali metal salts of the double salicylic acid type compounds are typical examples of the broad class of salts covered by the general formula. Other salts included are those in which X designates radicals of organic bases or such metals as iron or zinc.

The esters of the compounds of the bis-salicylic acid type of this invention are those designated by the given general structural formula when either at least one X represents an alkyl radical or at least one Z represents an acyl radical. The alkyl or acyl radicals referred to may be of either a higher or a lower molecular nature, either saturated or unsaturated. Specific examples of alkyl or acyl radicals are those of acids such as acetic, isobutyric, caprylic, lauric, palmitic, stearic, oleic, linoleic, and ricinoleic acids. These radicals, furthermore, may be of either an aryl or aralkyl nature. For example, the acyl radical may be that of benzoic, salicylic, cinnamic, or naphthoic acid.

EXAMPLE 1

*1,1-bis-(4'-hydroxy-3'-carboxyl-phenyl)-cyclohexane*

Four parts by weight of 1,1-bis-(4'-hydroxyphenyl)-cyclohexane ($C_{18}H_{20}O_2$), M. P. 184° C., prepared by condensing cyclohexanone with phenol in the molecular ratio of one to two in the presence of an acidic catalyst, are dissolved in 1.75 parts by weight of absolute methyl or ethyl alcohol. One part by weight of metallic sodium is dissolved in 1.75 parts by weight of absolute methyl or ethyl alcohol. The two solutions are then mixed and placed within a reaction chamber provided with a gas inlet tube and a still head attached to a condenser. The gas inlet tube is connected to a drying tube filled with calcium chloride. This drying tube, in turn, is connected with a gas wash chamber containing a concentrated sodium carbonate solution.

About 1.5 parts by weight of asbestos previously purified by ignition are then added to the solution. After this the reaction system is evacuated and the reaction chamber heated on a steam bath. After the alcohol has distilled off, the steam bath is exchanged for an oil or metal bath and the reaction mixture is gradually heated to 180° C. As soon as this temperature is reached, the evacuation is discontinued and dry carbon dioxide is passed into the reaction mixture instead, the carbon dioxide being preliminarily passed through the sodium carbonate solution and then through the drying tube. This procedure is continued for two hours.

Next the reaction mixture is allowed to cool in an atmosphere of carbon dioxide. As soon as room temperature has been reached, the reaction mass is extracted with two successive portions of approximately 7 parts of hot water on a steam bath for twenty minutes. The hot water extracts are then combined and filtered and the filtrate allowed to cool. The filtrate is then acidified with dilute (10%) hydrochloric acid until a distinctly acid reaction to Congo is obtained. The reaction product separates either as a solid, or semi-solid mass or sometimes as an oil. It is allowed to settle and is then freed from the water either by decantation or filtration. The reaction product is then dried and finally treated with a solvent, such as boiling xylene, to remove any unreacted starting material as well as any mono-salicylic acid. The bis-salicylic acid which is insoluble in xylene remains undissolved. It is then separated from the xylene extract by filtration or by decantation. The so obtained product may then be crystallized from ethyl alcohol. The melting point of the cyclo-alkylidene bis-salicylic acid, $C_{20}H_{20}O_6$, so obtained is 250° C. (uncorrected).

EXAMPLE 2

*1,1-bis-(4'-hydroxy-3'-methyl-6'-carboxyl-phenyl)-cyclohexane*

Two hundredths of a mol (5.8 grams) of 1,1-bis-(3'-methyl-4'-hydroxy-phenyl)-cyclohexane, $C_{20}H_{24}O_2$, is dissolved in 30 cc. of absolute ethyl alcohol. Three hundredths of the atomic weight equivalent of metallic sodium (0.7 gram) are dissolved in 30 cc. of absolute ethyl alcohol. The two solutions are then mixed and placed into a 100 cc. round-bottomed reaction flask. Two grams of glass wool are then added to the alcoholic solution of the sodium salt of the bis-o-cresol. The flask is provided with a glass stopper possesing a standard glass ground joint fitting into the neck of the reaction flask.

The glass stopper carries a gas inlet tube and a side arm. To this side arm is connected a receiver or a condenser and a receiver. The gas inlet tube which extends almost to the bottom of the reaction flask carries a gas purifying and drying arrangement. The gas utilized passes first through a gas wash-bottle filled with concentrated sodium carbonate solution, then through a drying tube filled with a dehydrating agent such as calcium chloride. The reaction flask is placed upon a suitable heating bath, metal, sand or oil, provided with a thermometer. The glass stopper is then inserted into the reaction flask. The inlet tube is connected with the drying tube and the side arm with the receiver. The system is then evacuated allowing a fine stream of air to pass first through the sodium carbonate solution, then through the drying tube and finally into the reaction flask containing the alcoholic solution of the sodium salt of the bis-phenol mixed with the absorbent asbestos. The heating is then begun and the alcohol allowed to distill off. After the alcohol has distilled off the temperature is gradually raised to 180° C. As soon as this temperature is reached evacuation is discontinued and carbon dioxide is allowed to enter the reaction flask instead, the gas going first through the gas washing-bottle containing the sodium carbonate solution, and then through the drying tube. This process of passing dry carbon dioxide gas through the reaction mixture at 180° C. is continued for two hours.

The reaction mixture is then allowed to cool to room temperature in an atmosphere of carbon dioxide. Twenty cc. of 20% aqueous sodium hydroxide solution is then added to the reaction mixture in the flask, whereupon it is heated on a steam bath for twenty minutes. The mixture is then filtered through a fritted glass filter. The flask as well as the absorbent is washed twice with 10 cc. portions of distilled water. These washings are added to the alkaline extract. The filtered extract is acidified with dilute (10%) aqueous hydrochloric acid until distinctly acid to Congo. The acidified extract is then extracted in a separatory funnel with two successive 25 cc. portions of ether. The combined ether extract is washed with 30 cc. of distilled water and then extracted with 30 cc. of 5% sodium carbonate solution. The sodium carbonate solution is separated and then extracted with 25 cc. of ether to remove any non-carboxylated product. The sodium carbonate solution is then acidified with 10% hydrochloric acid until distinctly acid to Congo. This acidified extract is again extracted with two 30 cc. portions of ether. The resulting ether extracts are combined and washed with 30 cc. of distilled water. The combined ether extracts are then dried with anhydrous sodium sulfate, filtered, and the ether allowed to evaporate at room temperature. The residue left is then treated with hot benzene, toluene, or xylene to remove any mono-salicylic acid. The product upon being crystallized from alcohol is a cyclo-alkylidene alkyl substituted bis-salicylic acid, $C_{22}H_{24}O_6$, having a melting point of 258° C. (uncorrected).

EXAMPLE 3

*1,1-bis-(4'-hydroxy-3'-methoxy-6'-carboxyl-phenol)-cyclohexane*

One mol equivalent of 1,1-bis-(4'-hydroxy-3'-methoxy-phenyl)-cyclohexane, $C_{20}H_{24}O_4$, M. P. 174° C. prepared by condensing one mol equivalent of cyclohexanone with two mol equivalents of guaiacol is dissolved in five parts of absolute methyl or ethyl alcohol. Three atomic weight equivalents of metallic sodium are dissolved in about 20 parts of absolute methyl or ethyl alcohol. The two solutions are mixed and about half the weight of the initial bis-phenol of asbestos which has been purified by ignition is added to the combined solutions. The reaction is then carried out according either to Example 1 or to Example 2.

Instead of the above 1,1-bis-(4'-hydroxy-3'-methoxy-phenyl) cyclo-hexane, the 1,1-bis-(4'-hydroxy-3'-methoxy-phenyl)-4-methyl-cyclohexane (M. P. 165° C.) or the 1,1-bis-(4'-hydroxy-3'-methoxy-phenyl)-3-methyl-cyclohexane (M. P. 149° C.) might be used in the reaction to yield the respective alkoxy substituted bis-salicylic acids.

Example 4

2,2-bis-(4'-hydroxy-3'-carboxyl-phenyl)-4-methyl-butane

One mol equivalent of 2,2-bis-(4'-hydroxyphenyl)-4-methyl-butane, M. P. 150° C., $C_{18}H_{22}O_2$, prepared by condensing one mol equivalent of methyl iso-butyl ketone with two mol equivalents of phenol in the presence of an acidic catalyst, is dissolved in five parts of absolute methyl or ethyl alcohol. To this solution is added a solution of equal volume of absolute methyl or ethyl alcohol containing three mol equivalents of sodium methyl- or ethylate. The carboxylation is then carried out according to Example 1 or to Example 2.

Other alkylidene bis-salicylic acids may be prepared in a similar manner by the carboxylation of the p,p-diphenol (M. P. 270° C.), the 4,4'-dihydroxy-diphenyl-methane (M. P. 158° C.), the 1,1-bis-(4'-hydroxy-phenyl)-ethane (M. P. 122° C.), the 1,1- and the 2,2-bis-(4'-hydroxy-phenyl)-propanes (M. P. 130° C. and 152° C. resp.), the 1,1- and 2,2-bis-(4'-hydroxy-phenyl)-butanes (M. P. 136° C. and 124° C. resp.), the 3,3-bis-(4'-hydroxy-phenyl)-pentane (M. P. 198° C.), the 4,4-bis-(4'-hydroxy-phenyl)-heptane (M. P. 155° C.) and the 2,2-bis-(4'-hydroxy-phenyl)-octane (M. P. 83° C.).

Example 5

1-(4'-methyl-phenyl)-1,1-bis-(4'-hydroxy-3'-carboxyl-phenyl)-ethane

One mol equivalent of 1-(4'-methyl-phenyl)-1,1-bis-(4'-hydroxy-phenyl)-ethane, M. P. 133° C., $C_{22}H_{22}O_2$, prepared by condensing one mol equivalent of p-tolyl-methyl ketone with two mol equivalents of phenol in the presence of an acidic catalyst, is dissolved in five parts of absolute methyl or ethyl alcohol. To this alcoholic solution of the bis-phenol is added an equal volume of absolute methyl or ethyl alcohol containing three mol equivalents of sodium methylate or sodium ethylate. After the addition of the adsorbent the carboxylation is carried out substantially as described in either Example 1 or Example 2.

The homologues of the above bis-phenol, such as the 4,4'-dihydroxy-triphenyl-methane (M. P. 161° C.), the 4,4'- and the 6,6'-dihydroxy-3,3'-dimethyl-triphenylmethanes (M. P. 170° C. and 158-160° C. resp.) and the 1-phenyl-1,1-bis-(4'-hydroxy-phenyl)-ethane (M. P. 187° C.) may be carboxylated in substantially the same manner.

Example 6

Disodium salt of 1,1-bis-(4'-hydroxy-3'-carboxyl-phenyl)-cyclohexane

One mol equivalent of the bis-salicylic acid is dissolved in 15 parts of 95% ethyl alcohol. To this alcoholic solution is added 60 parts of 0.1 N sodium hydroxide solution. The resulting mass is then evaporated to dryness on a steam bath. The residue is dissolved in 15 parts of distilled water and the solution is filtered. The filtrate is then evaporated on a steam bath and the residue treated with ether. The residue which can be crystallized from dilute alcohol is the di-sodium salt of the bis-salicylic acid, $C_{20}H_{18}O_6Na_2$.

Example 7

The acetate of 1,1-bis-(4'-hydroxy-3'-carboxyl-phenyl)-cyclohexane

One mol equivalent of the bis-salicylic acid is introduced into an all glass ground reflux apparatus. To this, 6 parts of acetic acid anhydride is added, and the mixture is refluxed for six hours. The mixture is then allowed to cool and is then poured into water. This mixture is then permitted to stand until all the excess acetic acid anhydride has reacted with water. The acetylated bis-salicylic acid is left as a residue. Sometimes the acetate crystallizes directly in the acetylation flask. The diacetate, $C_{24}H_{24}O_8$, may be recrystallized from alcohol. It has a melting point of 213° C. (uncorrected).

The above procedures and compounds are merely illustrative examples of preferred embodiments of the process and products of my invention.

In its broadest aspects the instant invention contemplates alkylidene, cyclo-alkylidene or aryl-alkylidene bis-salicylic acids, their salts and their esters. Likewise, it includes those bis-salicylic acid salts or esters of the above type in which the phenyl group of the salicylic acid is substituted by other radicals.

It should be understood that the invention is not limited to the specific examples set out herein, but that it extends to all equivalent materials and structural alterations which will occur to those skilled in the art upon consideration of the instant disclosure and the scope of the claims appended hereto.

I claim:

1. The process for the preparation of new bis-salicylic acid type compounds from bis-phenols which comprises treating substantially anhydrous alkali metal salts of bis-phenols with carbon dioxide at a temperature in excess of 140° C. at a pressure less than superatmospheric.

2. The process for the preparation of new bis-salicylic acid type compounds from bis-phenols which comprises forming alkali metal salts of the bis-phenols, heating the said salts to a temperature of at least 140° C., introducing carbon dioxide into the heated mass and reacting the gas with the said salts while maintaining intimate surface contact of the salts and the molecules of said gas.

3. The process for the preparation of new bis-salicylic acid type compounds from bis-phenols which comprises forming alkali metal salts of the bis-phenols in the presence of a solid absorbent, heating the said salts and absorbent under substantially anhydrous conditions at a temperature of at least 140° C., introducing carbon dioxide gas into the heated mass and reacting said gas with the said salts at a pressure less than superatmospheric.

4. The process for the preparation of new bis-salicylic acid type compounds from bis-phenols which comprises forming alkali metal salts of bis-phenols in a reaction zone containing asbestos, heating the salts so formed to substantially dry the same, continuing the heating at a temperature in excess of 140° C., introducing carbon dioxide gas into the reaction chamber and reacting the gas with the said salt at a pressure less than superatmospheric.

5. The process for the preparation of new bis-salicylic acid type compounds from bis-phenols which comprises forming alkali metal salts of bis-phenols in a reaction zone containing glass wool, heating the salts so formed to substantially dry the same, continuing the heating at a temperature in excess of 140° C., introducing carbon dioxide gas into the reaction chamber and reacting the gas with the said salt at a pressure less than superatmospheric.

6. The process for the preparation of new bis-salicylic acid type compounds from bis-phenols which comprises forming alkali metal salts of the bis-phenols in a reaction chamber containing a solid absorbent which provides a large surface area, heating the absorbent and the salts so formed under anhydrous conditions at a temperature of about 180° C., introducing carbon dioxide gas into the reaction chamber and reacting the gas with the said salts at a pressure less than superatmospheric.

7. The process for the preparation of new bis-salicylic acid type compounds from bis-phenols which comprises forming alkali metal salts of the bis-phenols in a reaction chamber containing glass wool, heating the glass wool and the salts so formed to substantially dry the same, continuing the heating at a temperature of about 180° C., introducing carbon dioxide gas into the reaction chamber and reacting the gas with the said salts at a pressure less than superatmospheric.

8. A bis-salicylic acid compound of the general formula:

$$R=C=[Ar (COOH) OH]_2$$

wherein R=C is a carbocyclic ring and Ar is a benzene ring.

9. A cycloalkylidene bis-salicylic acid type compound of the general structural formula:

$$R[C_6H_2 (COOX) (Y) OZ]_2$$

wherein R represents a cycloalkylidene radical, X represents a member of the group consisting of hydrogen, a metal atom and an alkyl group, Y represents a member of the group consisting of a hydrogen atom, an alkyl radical and an alkoxy radical, and Z represents a member of the group consisting of hydrogen and an acyl radical of a carboxylic acid.

10. A bis-salicylic acid type compound of the general structural formula:

$$R[C_6H_2 (COOX) (Y) OZ]_2$$

wherein R represents a carbocyclicidene radical, X represents a member of the group consisting of hydrogen, a metal atom and an alkyl group, Y represents a member of the group consisting of a hydrogen atom, an alkyl radical and an alkoxy radical, and Z represents a member of the group consisting of hydrogen and an acyl radical of a carboxylic acid.

11. A bis-salicylic acid of the following structural formula:

$$R[C_6H_2 (COOH) (Y) OH]_2$$

wherein R represents a carbocyclicidene radical, and Y represents a member of the group consisting of a hydrogen atom, an alkyl radical and an alkoxy radical.

12. An ester of a bis-salicylic acid type compound of the following structural formula:

$$R[C_6H_2 (COOX) (Y) OZ]_2$$

wherein R represents a carbocyclicidene radical, X represents a member of the group consisting of hydrogen, a metal atom and an alkyl group, Y represents a member of the group consisting of a hydrogen atom, an alkyl radical and an alkoxy radical, Z represents a member of the group consisting of a hydrogen atom and an acyl group of a carboxylic acid, and wherein X and Z do not at the same time represent hydrogen atoms.

13. A salt of a bis-salicylic acid type compound of the following structural formula:

$$R[C_6H_2 (COOX) (Y) OH]_2$$

wherein R represents a carbocyclicidene radical, Y represents a member of the group consisting of a hydrogen atom, an alkyl radical and an alkoxy radical, and wherein at least one X represents a metal atom and the other a hydrogen atom.

14. A di-acetic acid ester of a bis-salicylic acid type compound of the following structural formula:

$$R[C_6H_2 (COOH) (Y) OOC_2H_3]_2$$

wherein R represents a carbocyclicidene radical, and Y represents a member of the group consisting of a hydrogen atom, an alkyl radical and an alkoxy radical.

15. An alkali metal salt of a bis-salicylic type compound of the following structural formula:

$$R[C_6H_2 (COOX) (Y) OH]_2$$

wherein R represents a carbocyclicidene radical, Y represents a member of the group consisting of hydrogen, an alkyl radical or an alkoxy radical, and wherein at least one X represents an alkali metal and the other a hydrogen atom.

16. A di-sodium salt of a bis-salicylic acid type compound of the following structural formula:

$$R[C_6H_2 (COONa) (Y) OH]_2$$

wherein R represents a carbocyclicidene radical, and Y represents a member of the group consisting of hydrogen, an alkyl radical and an alkoxy radical.

17. Cyclo-hexylidene bis-salicylic acids.

18. 1,1 bis-(4'-hydroxy-3'-methyl-6'-carboxyphenyl)-cyclohexane.

19. Cyclo-alkylidene bis-salicylic acids.

20. The acetic acid esters of cyclo-alkylidene bis-salicylic acid type compounds wherein the phenol ring is further substituted by an alkyl radical.

21. The acetates of cyclo-alkylidene bis-salicylic acids.

JOSEPH B. NIEDERL.